Figure 1:
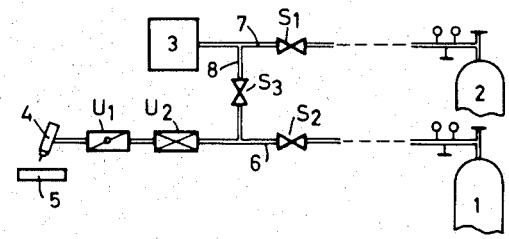

Dec. 14, 1965  H. WITTEMANN  3,223,819
METHOD AND APPARATUS FOR WELDING WITH PROTECTIVE GAS
Filed June 19, 1964

United States Patent Office 3,223,819
Patented Dec. 14, 1965

3,223,819
METHOD AND APPARATUS FOR WELDING WITH PROTECTIVE GAS
Hanskarl Wittemann, Gerbrunn, near Wurzburg, Germany, assignor to Siemens-Schuckertwerke Aktiengesellschaft, Berlin-Siemensstadt and Erlangen, Germany
Filed June 19, 1964, Ser. No. 376,421
Claims priority, application Germany, June 19, 1963, S 85,716
13 Claims. (Cl. 219—74)

My invention relates to method and apparatus for welding with protective gas.

As a rule, such welding is performed with a tungsten electrode, using argon as the protective gas. After the welding current is shut off, the flow of argon over the electrode is continued for some time in order to protect the still hot electrode from atmospheric oxygen and also to cool it more quickly. Since argon is relatively expensive, and in mass-welding processes the time needed for cooling may be longer than the welding period itself, the argon consumption for after-flow purposes is rather costly.

It is accordingly an object of my invention to provide a method of welding with protective gas and apparatus for carrying out the method which are considerably more economical than the methods and devices employed heretofore.

It is also an object of my invention to prevent wasteful use of high cost protective gas by restricting its use only to the actual welding operation.

It is a further object of my invention to provide an apparatus consisting of conventional components that are relatively simple to connect, assemble and install.

With these and other objects in view, I provide a method of welding with protective gas and apparatus for carrying out the method that employ a protective gas different from the gas used during the welding process for blowing against the electrode to cool the same after the welding current has been cut off. The cheapest possible gas is used for after-flowing, provided only that it should not react with the material of the electrode. Furthermore, this gas should possess the highest possible heat-absorption capacity. Best suitable from these viewpoints are hydrogen and nitrogen because they are the cheapest gases available that do not react with the tungsten electrode.

Assuming that a gas molecule impinges upon the tungsten surface and is absorbed until it escapes at the temperature of the tungsten, the removed heat quantity—referring to the unit value for argon—is 1.4 for nitrogen, and 1.3 for hydrogen. Since nitrogen is also considerably cheaper than hydrogen, it is preferable to use nitrogen as the after-flow gas.

The duration of the after-flow period depends on the electrode cooling period which, in turn, depends on the temperature of the electrode at the moment the welding current is shut off and on the heat absorption capacity of the after-flow gas. Hence, the after-flow period must be correspondingly chosen. This can be done for example, by using a correspondingly dimensioned after-flow gas container or a timing relay. The switching from protective welding gas to after-flow gas is preferably done by means of magnetic valves, such as solenoid-controlled valves, controlled together with the on- and off-switching of the welding current.

Other features which are considered as characteristic for the invention are set forth in the appended claims.

Although the invention has been illustrated and described as method and apparatus for welding with protective gas, it is nevertheless not intended to be limited to the details shown, since various modifications and changes may be made therein without departing from the spirit of the invention and within the scope and range of equivalents of the claims.

Figure 2:
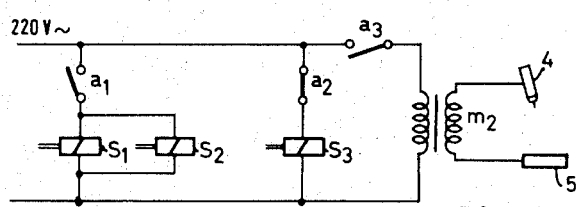
Figure 3:
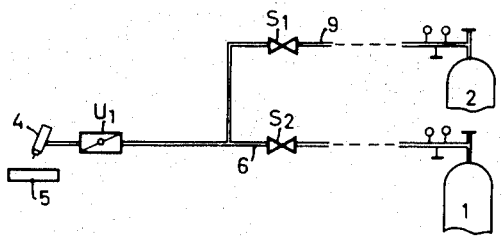
Figure 4:
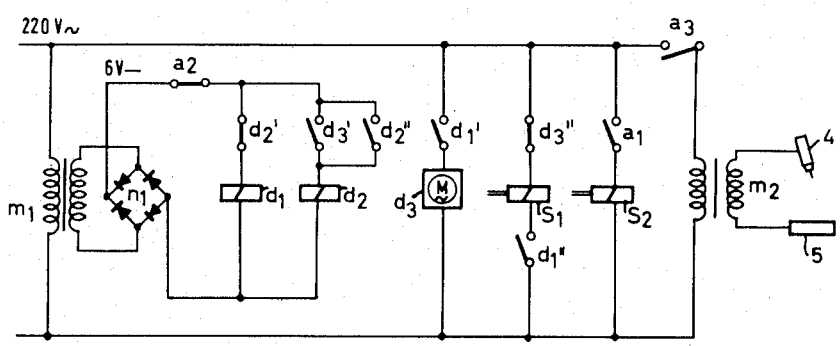

The method of the invention and the operation of the apparatus for carrying out the method, together with additional objects and advantages thereof will be best understood from the following description of two embodiments thereof, for example, when read in connection with the accompanying drawings in which:

FIGS. 1 and 3 are schematic illustrations of two different welding apparatus, respectively; and FIGS. 2 and 4 illustrate the corresponding two circuit diagrams.

The apparatus shown in FIG. 1 is equipped with a supply container 1 with argon, a supply container 2 with nitrogen, and a container 3 with the after-flow gas, preferably nitrogen. The containers communicate with a welding torch 4 for work on a workpiece 5. The torch 4 and the container 1 are connected by a conduit 6, in which a magnet valve $S_2$, a check valve $U_2$ and a pressure reducing valve $U_1$ are inserted. Container 2 is connected with the after-flow gas container 3 by a conduit 7 with a magnet valve $S_1$. The two conduits 6 and 7 are interconnected by a transverse conduit 8 with an additional magnet valve $S_3$.

The electric control circuits of the valves $S_1$ to $S_3$ (FIG. 2) comprise contacts $a_1$ and $a_2$ of the welding-current contactor $a_3$ which controls the energization of the welding-current transformer $m_2$. The contact positions are shown for the idle condition of the apparatus.

The apparatus of FIGS. 1 and 2 is operated in the following manner: When the welding current is switched on by closing of the contactor $a_3$, the contact $a_1$ closes. The two valves $S_1$ and $S_2$ receive voltage and are opened. Hence, argon from container 1 can reach the torch, while nitrogen from container 2 flows simultaneously into the after-flow container 3 and fills the same. During this operation, the contact $a_2$ is open so that valve $S_3$ does not receive voltage and is closed. Hence there is no connection between conduits 6 and 7.

When thereafter the welding current is cut off by opening of the contactor $a_3$, the contact $a_2$ closes and contact $a_1$ opens. This closes the valves $S_1$, $S_2$ and opens the valve $S_3$. Now nitrogen from container 3 can reach the electrode 4 through conduits 7, 8 and 6 and blows against the electrode until container 3 is empty. The volume of the after-flow container and its filling pressure are so rated that the gas contents correspond substantially to the necessary cooling time of the electrode.

In FIG. 3, the containers 1 and 2 are filled with the two different protective gases respectively. Container 1 is connected with the electrode 4 by a conduit 6 with a magnetically controlled valve $S_2$ and a throttle valve $U_1$. Connected to the protective-gas container 2 is a conduit 9 with a magnet valve $S_1$. This conduit joins the conduit 6 behind valve $S_2$. No after-flow container is required. After the welding current is switched-off, the cooling gas flows directly to the electrode. The period of supplying the torch with cooling gas is controlled by a timing relay $d_3$ (FIG. 4).

The circuit diagram shown in FIG. 4 indicates all contact positions for the idle condition of the apparatus, which operates as follows:

When contactor $a_3$ is closed the welding current is turned on and the contact $a_1$ is closed and controls the valve $S_2$ to open so that protective argon can flow from container 1 to the electrode 4. Simultaneously, contact $a_2$ is open and interrupts a 6-volt direct-current network energized from a transformer $m_1$ through a rectifier $n_1$. Consequently, two relays $d_1$ and $d_2$ in this network are deenergized and their contacts $d_1'$, $d_1''$ and $d_2'$, $d_2''$ are in the positions illustrated. Since contacts $d_1''$ in the circuit of valve $S_1$ is open, this valve is closed and not nitrogen can flow from the container 1 to the torch 4.

When a welding operation is terminated and the contactor $a_3$ opened, contact $a_1$ opens and contact $a_2$ closes. Now contact $a_1$ interrupts the circuit of valve $S_2$ so that this valve closes and stops the flow of argon. Closed contact $a_2$ applies voltage to relay $d_1$, contact $d_2'$ still being closed, and contacts $d_1'$ and $d_1''$ close. This in turn opens valve $S_1$ so that nitrogen can now flow from container 2 to the torch.

The motor of the timing relay $d_3$ begins to run simultaneously, due to the closing of contact $d_1'$. After a fixed timing period, the relay $d_3$ opens contact $d_3''$ which deenergizes and closes the valve $S_1$. At the same time, contact $d_3'$ of the timing relay also closes. This causes the self-holding relay $d_2$ to close its self-holding circuit at control $d_2''$ and to open its contact $d_2'$. Thus the relay $d_1$ is deenergized and contacts $d_1'$ and $d_1''$ open.

Consequently, after the cooling of the electrode is completed, the circuit components resume their original condition, with the exception of the self-holding relay $d_2$ and its two contacts $d_2'$ and $d_2''$. Should the welding current be turned on again for another welding operation, the contact $a_2$ opens, which releases relay $d_2$ to close the contact $d_2'$ and open the contact $d_2''$. Hence the direct-current network is now also idle, and after the welding current is again switched off, the cooling process can again be initiated as previously described.

I claim:

1. A method of welding which comprises enveloping a welding electrode at its welding location with a protective gas of relatively high cost as said electrode is being heated at said location to welding temperature by an electric current passing through said electrode, removing said protective gas of relatively high cost from said welding location when said electric current is discontinued and simultaneously enveloping said electrode at said location with a protective gas of relatively low cost for cooling said electrode at said location.

2. A method of welding which comprises enveloping a welding electrode at its welding location with a protective gas of relatively high cost as said electrode is being heated at said location to welding temperature by an electric current passing through said electrode, removing said protective gas of relatively high cost from said welding location when said electric current is discontinued and simultaneously enveloping said electrode at said location with a protective gas of relatively low cost and of relatively high heat-absorption capacity for cooling said electrode at said location.

3. A method of welding which comprises enveloping a welding electrode at its welding location with a protective gas of relatively high cost as said electrode is being heated at said location to welding temperature by an electric current passing through said electrode, removing said protective gas of relatively high cost from said welding location when said electric current is discontinued and simultaneously enveloping said electrode at said location with relatively low cost hydrogen gas for cooling said electrode at said location.

4. A method of welding which comprises enveloping a welding electrode at its welding location with a protective gas of relatively high cost as said electrode is being heated at said location to welding temperature by an electric current passing through said electrode, removing said protective gas of relatively high cost from said welding location when said electric current is discontinued and simultaneously enveloping said electrode at said location with relatively low cost nitrogen gas for cooling said electrode at said location.

5. A method of welding which comprises controlling the flow of electric current through a welding electrode for heating said electrode at its welding location to welding temperature; magnetically controlling, in dependence upon control of said current, the flow of relatively high cost protective gas and of relatively low cost protective gas selectively to said welding location; enveloping said welding location in a protective atmosphere of said flow of relatively high cost protective gas when said electrode is heated by the flow of said current and enveloping said welding location in an atmosphere of said flow of relatively low cost protective gas for cooling said location when said current is discontinued.

6. Apparatus for welding with protective gas comprising a welding electrode heatable by an electric current to welding temperature at its welding location; first supply means for supplying, during heating of said electrode by said current, a flow of relatively high cost protective gas to envelop said welding location so as to prevent oxidation of said electrode at said location; second supply means for supplying a measured quantity of relatively low cost protective gas to said welding location for enveloping and cooling said welding location to non-oxidizing temperature when said electrode heating current is discontinued and common circuit means for selectively conducting said first and second supply means to said welding location.

7. Apparatus for welding with protective gas comprising a welding electrode heatable by an electric current to welding temperature at its welding location, supply means for supplying during heating of said electrode by said current a flow of relatively high cost protective gas to envelop said welding location so as to prevent oxidation of said electrode at said location, container means for receiving a measured quantity of relatively low cost protective gas and for supplying said measured quantity to said welding location for enveloping and cooling said welding location when said electrode heating current is discontinued, said measured quantity being adequate for cooling said welding location to non-oxidizing temperature and common circuit means for selectively conducting said first and second supply means to said welding location.

8. Apparatus for welding with protective gas comprising a welding electrode heatable by an electric current to welding temperature at its welding location, a relatively high cost protective gas source and a relatively low cost protective gas source, conduit means extending from said protective gas sources to said welding location, and control means comprising a plurality of valves in said conduit means magnetically controllable in dependence on the presence and absence of said electrode heating current for supplying relatively high cost protective gas from its source through said conduit means to said welding location to envelop and thereby prevent oxidation of said electrode at said location during heating of said electrode by said current, and for supplying a measured quantity of relatively low cost protective gas from its source through said conduit means to said welding location for enveloping and cooling said location when said electrode heating current is discontinued, said measured quantity being sufficient for cooling said welding location to non-oxidizing temperature.

9. Apparatus according to claim 8 wherein said control means includes a timing mechanism operative at the discontinuance of said electrode heating current for supplying a flow of relatively low cost protective gas at a specific rate from its source to said welding location for a specific period of time, the total flow of said last-mentioned gas constituting said measured quantity.

10. Apparatus according to claim 8 including an afterflow container having a specific volumetric capacity, said container being connected to said relatively low cost protective gas source and communicating with said welding location through said conduit means, said control means, during heating of said electrode by said current, blocking communication between said container and said welding location and simultaneously permitting flow of said relatively low cost protective gas from its source into said container at a specific pressure, the total volume of said last-mentioned gas at said pressure in said container constituting said measured quantity.

11. Apparatus for welding comprising a tungsten welding electrode heatable by an electric current to welding temperature at its welding location, first supply means for supplying an atmosphere about said location of a first protective gas chemically non-reactive with tungsten at welding temperature; second supply means for substituting for said first gas an atmosphere about said location of a second protective gas for a period during which said location is cooled to a temperature at which tungsten is non-oxidizable, said second gas being different from said first gas and being non-reactive with tungsten and circuit means connected in common with said first and second supply means for selectively conducting said first and second supply means to said welding location.

12. A method of welding which comprises supplying an atmosphere of a first protective gas at the welding location of a welding electrode as said electrode is being heated at said location to welding temperature by an electric current passing through said electrode, removing said atmosphere of said first protective gas when said electric current is discontinued and simultaneously supplying an atmosphere of a second protective gas different from said first gas for cooling said electrode at said location.

13. A method of welding according to claim 12 wherein said welding electrode consists of tungsten at least at said welding location and said second protective gas is non-reactive with tungsten at welding temperature.

References Cited by the Examiner
UNITED STATES PATENTS

| | | | |
|---|---|---|---|
| 2,497,631 | 2/1950 | Rothschild | 219—74 |
| 2,510,207 | 6/1950 | Behnke et al. | 219—130 |
| 2,630,513 | 3/1953 | Redmond | 219—136 |
| 2,862,098 | 11/1958 | Hasselborn | 219—74 |

RICHARD M. WOOD, *Primary Examiner.*